(12) United States Patent
Torres et al.

(10) Patent No.: US 9,659,321 B2
(45) Date of Patent: May 23, 2017

(54) REAL-TIME RETURN OF LOCAL SEARCH CONTENT BASED ON GLOBAL SEARCH KEY

(71) Applicant: CISCO TECHNOLOGY, INC., San Jose, CA (US)

(72) Inventors: Esteban Raul Torres, Danville, CA (US); Ravi Akireddy, Santa Clara, CA (US); Robert J. Friday, Los Gatos, CA (US); Thirunavukkarasu Suresh, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 122 days.

(21) Appl. No.: 14/054,645

(22) Filed: Oct. 15, 2013

(65) Prior Publication Data

US 2014/0358732 A1 Dec. 4, 2014

Related U.S. Application Data

(60) Provisional application No. 61/829,663, filed on May 31, 2013.

(51) Int. Cl.
| | |
|---|---|
| *G06Q 30/00* | (2012.01) |
| *G06Q 30/06* | (2012.01) |
| *H04W 4/18* | (2009.01) |
| *G06F 17/30* | (2006.01) |

(52) U.S. Cl.
CPC ......... *G06Q 30/0623* (2013.01); *G06F 17/30* (2013.01); *G06F 17/30905* (2013.01); *H04W 4/18* (2013.01)

(58) Field of Classification Search
CPC ................. G06Q 30/0623; H04W 4/18; G06F 17/30905; G06F 17/30
See application file for complete search history.

(56) References Cited

U.S. PATENT DOCUMENTS

| | | | |
|---|---|---|---|
| 6,490,575 B1 | 12/2002 | Berstis et al. | |
| 8,169,958 B2 | 5/2012 | Torres et al. | |
| 8,566,596 B2 | 10/2013 | Stephenson et al. | |
| 8,612,844 B1 * | 12/2013 | Melton | ............. G06F 17/30896 715/200 |
| 2003/0078986 A1 * | 4/2003 | Ayres et al. | ................... 709/217 |
| 2005/0232131 A1 | 10/2005 | Bulleit et al. | |
| 2006/0136372 A1 * | 6/2006 | Schunemann | .................... 707/2 |
| 2011/0191290 A1 | 8/2011 | Gutlapalli et al. | |
| 2013/0304527 A1 | 11/2013 | Santos, III | |

* cited by examiner

*Primary Examiner* — William Allen
*Assistant Examiner* — Anand Loharikar
(74) *Attorney, Agent, or Firm* — Cindy Kaplan

(57) ABSTRACT

In one embodiment, a method includes receiving at a network device, a search key from a global search initiated at a mobile device, the network device in communication with the mobile device via a proxy operable to retrieve the search key from a packet transmitted from the mobile device, performing a search at the network device for local content associated with the search key, and transmitting the local content from the network device for display on the mobile device. An apparatus and logic are also disclosed herein.

18 Claims, 5 Drawing Sheets

REAL-TIME RETURN OF LOCAL SEARCH CONTENT BASED ON GLOBAL SEARCH KEY

STATEMENT OF RELATED APPLICATION

The present application claims priority from U.S. Provisional Application No. 61/829,663, entitled REAL-TIME RETURN OF LOCAL SEARCH CONTENT BASED ON GLOBAL SEARCH KEYS, filed May 31, 2013. The contents of this provisional application are incorporated herein by reference in its entirety.

TECHNICAL FIELD

The present disclosure relates generally to communication networks, and more particularly, to wireless networks.

BACKGROUND

The mobile Internet and smartphones are enabling people to find more options while shopping or looking for services, compare these options, and make a purchase online in real-time. For example, customers may check goods or services available at an enterprise and then use the mobile Internet to compare these goods or services to those available from competitors. If customers buy the competitor's goods or services online, the enterprise loses business from local customers.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
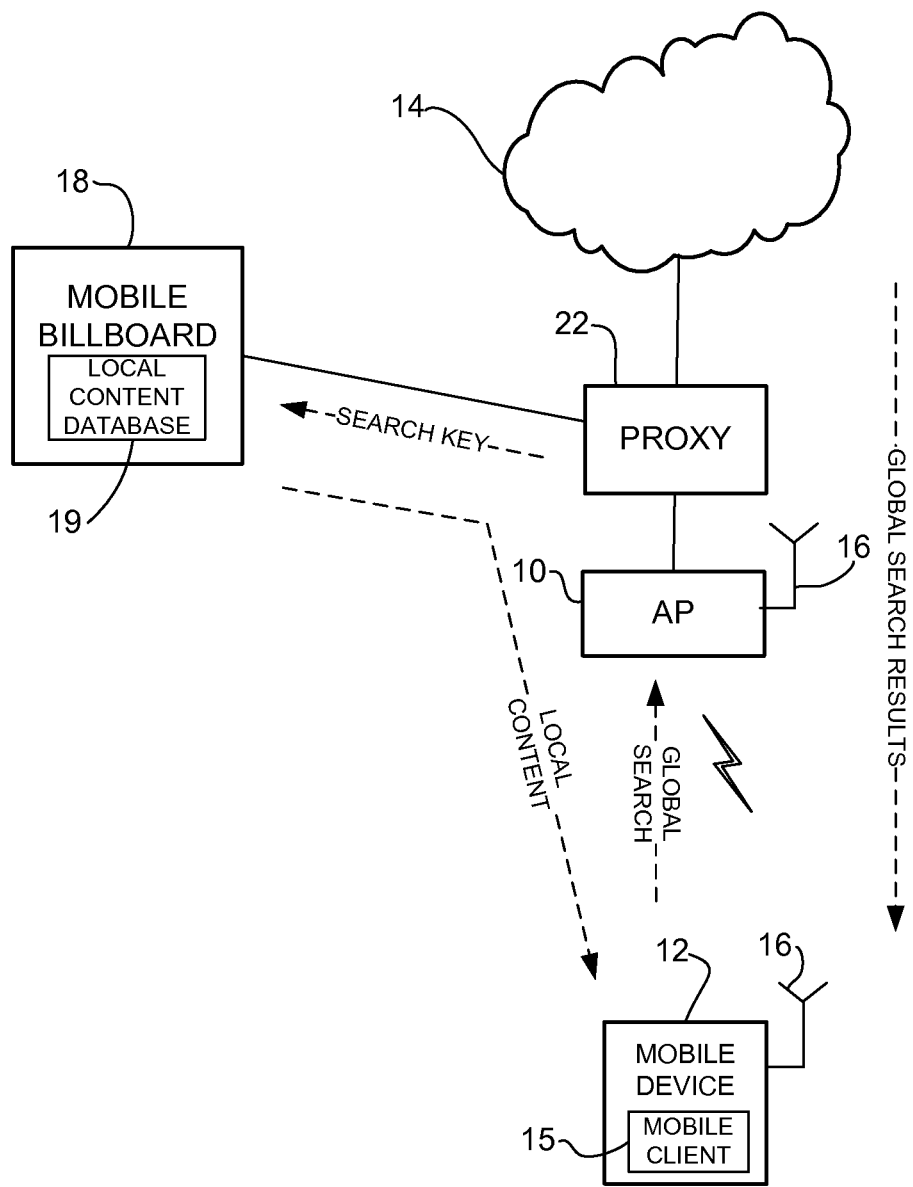
FIG. 1 illustrates an example of a network in which embodiments described herein may be implemented.

In one embodiment, a method generally comprises receiving at a network device, a search key from a global search initiated at a mobile device, the network device in communication with the mobile device via a proxy operable to retrieve the search key from a packet transmitted from the mobile device, performing a search at the network device for local content associated with the search key, and transmitting the local content from the network device for display on the mobile device.

In another embodiment, an apparatus generally comprises an interface for receiving a search key from a global search initiated at a mobile device, the apparatus configured for communication with the mobile device via a proxy operable to retrieve the search key from a packet transmitted from the mobile device, and a processor for searching a database for local content associated with the search key and transmitting the local content for display on the mobile device.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Retail and service industries may lose business from local customers that enter a business, check goods or services offered by the business, and then use the mobile Internet to compare and purchase the goods or services online. In particular, this hurts retailers that do not have their own branded goods. Examples include Best Buy in consumer electronics, Barnes and Noble in books, and department stores such as Macy's. In one example, a customer goes to a computer store to buy a laptop. While at the store, the customer does an Internet search on his smartphone for the laptop he found at the computer store, finds a better deal for a similar laptop, and purchases it online.

Another example is with the hospitality industry, including for example, large resorts with many attractions such as restaurants, shows, spas, etc. These resorts bring guests to their properties and want to keep them on their property, so that they can purchase the services and attractions offered by the resort. However, with the advent of smartphones, the guests are doing mobile Internet searches and finding better deals offered by competitors located outside of the resort, and then deciding to leave the resort for the competitor's deals. This translates into lost sales for the resort that brought the guest to the area.

Embodiments described herein enable enterprises to use their wireless networks to engage guests (customers, consumers, users, end users) more effectively by displaying relevant local search results to the guests when they do global Internet searches on their mobile devices. In one or more embodiments, the mobile device displays local search results at the same time the global search results are displayed. One or more embodiments use customer preferences to tailor the local search results or provide search results to enterprise personnel so that a custom response can be provided to the guest, either in person or online.

Referring now to the drawings, and first to FIG. 1, a network in which embodiments described herein may be implemented is shown. For simplification, only a small number of network devices are shown. The network shown in FIG. 1 includes an access point (AP) 10 in communication with a mobile device (wireless device, station, user device, client device) 12. The mobile device 12 may be, for example, a smartphone, tablet, laptop, personal digital assistant, or any other mobile device. The mobile device 12 includes a mobile client 15 operable to provide local search results to the mobile device, as described in detail below. The mobile client 15 may be, for example, a Java application, or any other module or interface operable to perform the functions described herein.

The AP 10 may serve any number of mobile devices 12. The AP 10 and mobile device 12 communicate in a wireless network via antennas 16 and are configured to perform wireless communication according to a wireless network communication protocol such as IEEE 802.11, for example.

The wireless network may include any number of APs 10. The AP 10 is also in communication with a wired network 14 (e.g., Internet). The network 14 may include one or more networks (e.g., local area network, metropolitan area network, wide area network, virtual private network, enterprise network, Internet, intranet, radio access network, public switched network, or any other network). The network 14 and data path between the AP 10 and network 14 may include any number or type of network devices that facilitate passage of data over the network (e.g., routers, switches, controllers, gateways).

The AP 10 is also in communication with network device 18, referred to herein as a mobile billboard. The network device 18 may comprise, for example, a server, or any other type of network device operable to perform the mobile billboard functions described herein. The mobile billboard may comprise, for example, a module, application, computer code, or other component installed at the network device. As described in detail below, the mobile billboard 18 is operable to provide local search results to mobile device 12.

The mobile billboard 18 may include one or more databases 19 containing local content and search keys associated with the local content. The database 19 may also include context information such as identity, personal preferences, etc., for customers using the mobile devices. In the example shown in FIG. 1, the database 19 is stored in memory located at the network device 18. The database 19 may also be stored at one or more network devices in communication with the mobile billboard 18.

As described below, the database 19 may comprise an indexed database of local content of the enterprise that the enterprise sends to guests when they are on their property. The local content may include, for example, messages, offers, etc., that are indexed to global search keys. The database 19 may comprise a table mapping search keys to local content, or any other type of data structure.

In one embodiment, the mobile billboard 18 comprises a mobile billboard as described in U.S. patent application Ser. No. 13/741,117, entitled "Real Time Mechanism for Location Based Messaging Using Wireless Networks", filed Jan. 14, 2013, which is incorporated herein by reference in its entirety.

The mobile billboard 18 may include a module operable to receive input from a graphical user interface (GUI) for configuring the mobile billboard. For example, the GUI can be used by an administrator to input data such as services available, special offers, messages, etc. for display on the mobile device 12. The mobile billboard 18 may be in communication with any number of mobile devices 12 via any number of APs 10.

In one embodiment, the mobile billboard 18 includes a rules engine that allows the enterprise to determine the set of content to display, including for example, AND set, OR set, or other, depending on how the content matches the search keywords.

In the example shown in FIG. 1 a proxy 22 is located in the data path between the AP 10 and mobile billboard 18. In one embodiment, the proxy comprises a hypertext transfer protocol (HTTP) proxy. The HTTP proxy 22 may operate, for example, at a router, switch, or other network device. The proxy 22 may also be located at the AP 10 or other network device located in the data path between the mobile device 12 and network 14. Other network devices (e.g., routers, switches, gateways, or controllers) or networks (e.g., network 14 or other network) may be disposed between the AP 10 and mobile billboard 18.

The HTTP proxy 22 enables an enterprise to insert information on top of a web page that is being provided to the mobile device 12. In one embodiment, the proxy 22 does not modify or alter the web page that is being provided to the mobile device 12, but presents new information on top of the web page (e.g., text, icon, image, banner, or other data), while the context of the web page remains the same.

The proxy 22 also provides a sniffing function on data packets transmitted from the mobile device 12 to network 14 to identify global search keywords. For example, the HTTP proxy 22 sees data packets transmitted between the mobile client 15 and the Internet 14 and gathers information from a global search initiated at the mobile device 12 and transmitted to the Internet. The information includes a search key (e.g., keyword, keywords, phrase, search term, or other data). This information is used to obtain local search results from the mobile billboard 18. The local search results are transmitted for display on the mobile device 12 along with the global search results from network 14.

The term 'global search' as used herein refers to a search input at the mobile device 12 that is transmitted to a global network (e.g., Internet), wherein global content is received from the network in response to the global search request. The term 'local content' as used herein refers to content associated with a local enterprise (e.g., retail store, service entity), wherein the mobile device 12 is associated with a wireless network of the enterprise.

It is to be understood that the network shown in FIG. 1 and described herein is only an example and that the embodiments may be implemented in networks having different network topologies and network devices, without departing from the scope of the embodiments.

Figure 2:
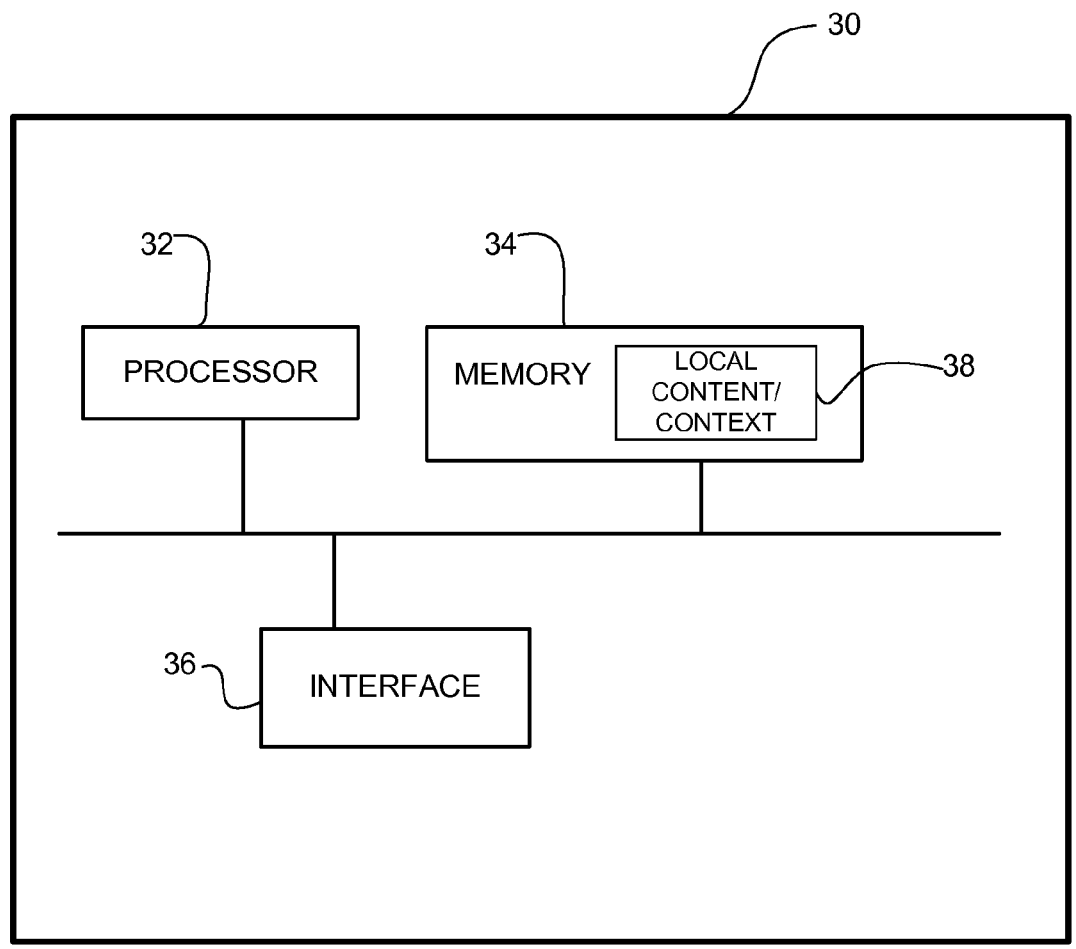
FIG. 2 depicts an example of a network device useful in implementing embodiments described herein.

FIG. 2 illustrates an example of a network device 30 (e.g., mobile billboard 18 in FIG. 1) that may be used to implement the embodiments described herein. In one embodiment, the network device 30 is a programmable machine that may be implemented in hardware, software, or any combination thereof. The network device 30 includes one or more processor 32, memory 34, and network interface 36.

Memory 34 may be a volatile memory or non-volatile storage, which stores various applications, operating systems, modules, and data for execution and use by the processor 32. For example, memory 34 may include local content/context 38 for use in providing local search results/local personalized search results to mobile device 12.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. Logic may be embodied as software stored on a non-transitory, tangible media operable to perform functions when executed by the processor 32.

The network interface 36 may comprise any number of interfaces (linecards, ports) for receiving data or transmitting data to other devices. The network interface 36 may include, for example, an Ethernet interface for connection to a computer or network.

It is to be understood that the network device 30 shown in FIG. 2 and described above is only an example and that different configurations of network devices may be used. For example, the network device 30 may further include any suitable combination of hardware, software, algorithms, processors, devices, components, or elements operable to facilitate the capabilities described herein.

Figure 3:
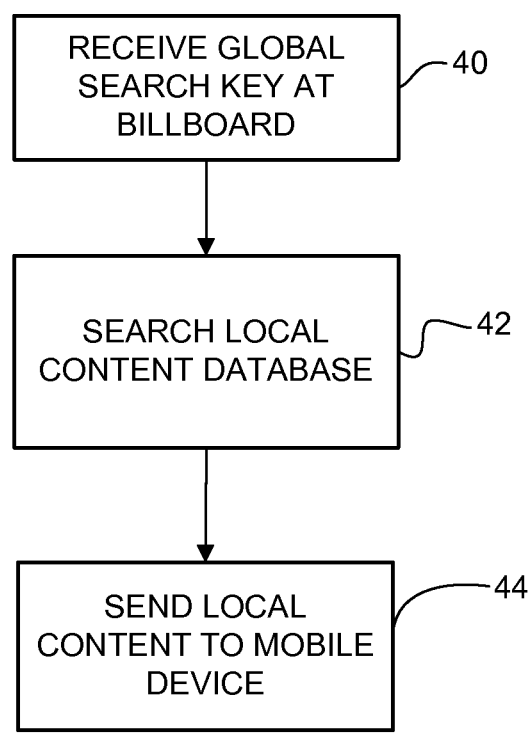
FIG. 3 is a flowchart illustrating an overview of a process for providing real-time return of local search content based on global search key, in accordance with one embodiment.

FIG. 3 is a flowchart illustrating an overview of a process at the mobile billboard 18 for providing real-time return of local search content based on a global search key, in accordance with one embodiment. When a customer (guest, user) enters an area serviced by the enterprise's wireless network, the wireless device 12 may associate with the network. The wireless device 12 may automatically connect to the wireless network or the customer may see that the wireless network is available and connect to the network. The customer uses a web browser installed on his mobile device to enter a search key and initiate a global search using the Internet. At step 40, network device (mobile billboard) 18 receives the global search key entered by the customer at his mobile device 12. The mobile billboard 18 searches local content database 19 (step 42). If there is a match, the mobile billboard 18 sends the result to the mobile device 12 via proxy 22 (step 44). The local content may be displayed on top of the customer's web browser using the HTTP proxy 22. As described below, other information, such as personal preferences, may be used to further enhance the local search results sent to the mobile device 12. The local search results may also be transmitted to a sales associate or other enterprise personnel for use in providing a more personalized or custom response to the customer.

It is to be understood that the process shown in FIG. 3 and described above is only an example and that steps may be added or modified without departing from the scope of the embodiments.

Figure 4:
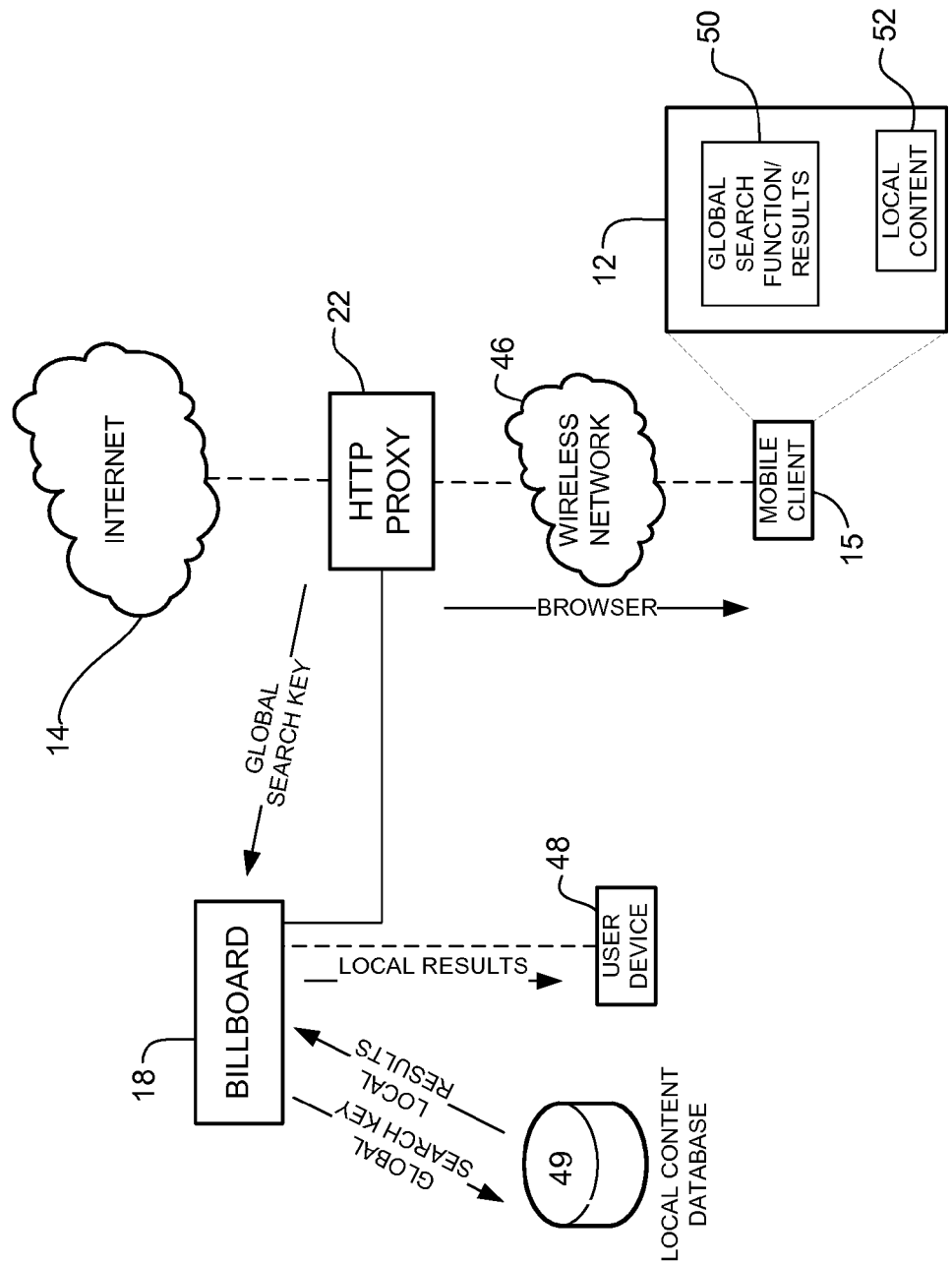
FIG. 4 is a block diagram illustrating an example of a mobile billboard in the network of FIG. 1, in accordance with one embodiment.

FIG. 4 illustrates additional details of a sniffing interface between the proxy 22 and mobile billboard 18, and a local search interface between the mobile billboard and local content database 49, in accordance with one embodiment. The mobile client 15 transmits a search via wireless network 46 to HTTP proxy 22. The wireless network 46 may be, for example, a Wi-Fi network, a small cellular network, a hotspot, or any other wireless network associated with the mobile billboard 18. The search comprises a global search key that is transmitted to the Internet 14 and to the billboard 18. As previously described, the HTTP proxy 22 provides a sniffing function used to identify the global search key. The mobile billboard 18 transmits the global search key to local content database 49. The key is used to search the database 49 and results of the search are returned to the billboard 18. The results may include, for example, messages, offers, or any other data that is indexed to the global search key.

In one example, the mobile client 15 is on the enterprise's Wi-Fi network 46 and the guest invokes a global search function (e.g. Google search, Amazon search, etc.) 50 and types in global search keywords. The HTTP proxy 22 provides these keywords to the mobile billboard 18 via the billboard/HTTP proxy sniffing interface. The mobile billboard 18 searches the local content database 49. If there is a match, the mobile billboard 18 displays local content 52 on top of the guest's web browser using the HTTP proxy 22. In this example, the mobile device 12 shows two search results on the display; global search result 50 provided by the global search engine and local search result 52 provided by the mobile billboard 18. The local content 52 may be displayed, for example, at the bottom of the display screen, or any other location.

In one embodiment, the local search results are also transmitted to one or more user devices (e.g., computer, mobile device) 48 for viewing by enterprise personnel. For example, a sales associate may receive a notification (e.g., text, email, pop-up, etc.) that a guest is searching for a specific device and assist the guest or send a personalized offer to the guest (e.g., lower price based on competitor's price). The global search key may also be transmitted to the enterprise personnel along with customer identification information (e.g., location of customer, identity of customer).

Figure 5:
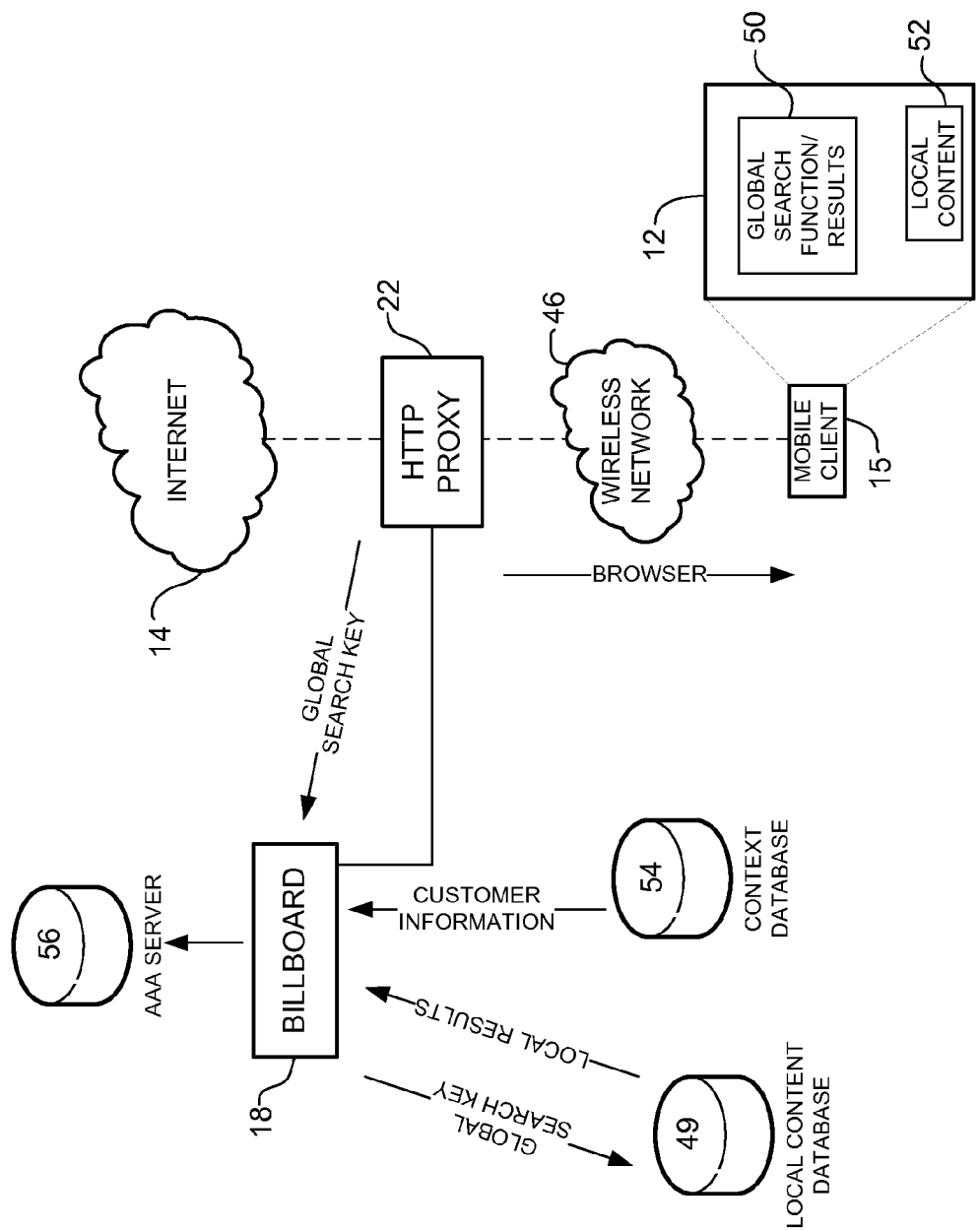
FIG. 5 is a block diagram illustrating an example of the mobile billboard in accordance with another embodiment.

FIG. 5 illustrates another example of the mobile billboard 18 in communication with a context database 54, which contains information such as client identity, personal preferences, and the like. In one embodiment, the context database 54 also contains an interface to the enterprise's guest AAA (authentication, authorization, and accounting) server 56. The mobile billboard 18 pings the AAA server 56 for the identity of a guest on the Wi-Fi network 46 and uses the identity to search the context database 54 for search keywords that have been indexed to the guest's identity. The indexing may be done, for example, by the guests supplying their personal preferences via a guest profile or a big data analytics algorithm. For example, the big data analytics algorithm may place guests into customer segments. The local and personalized content provided to the mobile device 12 is based at least in part on the customer (user) information.

The search results may also be based on a location of the user (e.g., location in store or resort). For example, a location server (e.g., Mobility Services Engine (MSE)) may be used to provide location information to the mobile billboard 18.

The following describes examples of use cases. It is to be understood that these are only examples and that the embodiments described herein may be used in other applications, without departing from the scope of the embodiments.

In a first example, a customer enters a retail store and looks at a product. The customer then pulls out his smartphone, notices that the retail store offers Wi-Fi and goes on the store's Wi-Fi network. The customer uses his browser to go to the Amazon web site and does a search for the same product that he is looking at in the store. At the same time that the Amazon search engine returns results, the mobile billboard 18 displays the local results at the bottom of the results web page. The enterprise may, for example, match the price advertised by Amazon.

In another example, a guest is staying at a resort and looking for a restaurant. The guest uses his smartphone to go on the Wi-Fi network at the resort. The guest launches Yelp and conducts a search for an Italian restaurant. At the same time that Yelp displays the results, the mobile billboard 18 displays relevant restaurants in the resort at the bottom of the web page.

In yet another example, the guest staying at the resort is looking for a show. While on the resort's Wi-Fi network, he launches Google search engine and types in keywords for a show. At the same time that Google search engine displays results, the mobile billboard 18 displays relevant shows in the resort at the bottom of the web page.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
processing at a network device, a global search key from an HTTP (hypertext transfer protocol) proxy interposed between a mobile device and the network device and operable to retrieve the global search key from a data packet transmitted from the mobile device to a global network for a global Internet search, the global search key based on a global search input at the mobile device and identified at the HTTP proxy by a sniffing function performed on the data packet, wherein the HTTP proxy transmits the global search key to the network device to obtain local content and to the global network to obtain the global content;
requesting from an authentication, authorization, and accounting server, an identity of a user initiating the global search at the mobile device;
performing analytics at the network device using information received from the authentication, authorization, and accounting server to index keywords to the user identity;
searching at the network device, a context database for the local content using the global search key and the user identity, the context database comprising local content, search keys mapped to the local content, and context information comprising personal preferences of the user; and
processing search results by a rules engine to determine the local content to return to the HTTP proxy for display at the mobile device based on the search results and one or more rules used to determine the local content to display at the mobile device; and
transmitting the local content from the network device to the mobile device via the HTTP proxy to generate the local content for display on the mobile device along with the global content received from the global network at the HTTP proxy in response to the global search initiated at the mobile device to provide the local content to the user initiating the search at the same time the global content from the global Internet search is displayed on the mobile device;
wherein the local content is based at least in part on the personal preferences of the user and wherein the mobile device is associated with a wireless network of an enterprise and the local content is associated with the enterprise.

2. The method of claim 1 wherein the local content is displayed along with results from the global search.

3. The method of claim 1 wherein the local content is displayed on top of a web browser.

4. The method of claim 1 wherein the local content comprises a message indexed to the search key.

5. The method of claim 1 wherein the search key comprises one or more keywords.

6. The method of claim 1 wherein the mobile device is in communication with an enterprise Wi-Fi network.

7. The method of claim 6 further comprising transmitting the local content to a device associated with enterprise personnel and receiving a custom response for the user by the enterprise personnel.

8. The method of claim 1 wherein transmitting the local content comprises new information on top of a web page identified in the global search without modifying the web page.

9. The method of claim 1 wherein said new information is inserted into a banner.

10. An apparatus comprising:
an interface for receiving a global search key from an HTTP (hypertext transfer protocol) proxy interposed between a mobile device and the apparatus and operable to retrieve the global search key from a data packet transmitted from the mobile device to a global network for a global Internet search, the global search key based on a global search input at the mobile device and identified at the HTTP proxy by a sniffing function performed on the data packet, wherein the HTTP proxy transmits the global search key to the apparatus to obtain local content and to the global network to obtain the global content; and
a processor for requesting from an authentication, authorization, and accounting server for an identity of a user initiating the global search at the mobile device, performing analytics using information received from the authentication, authorization, and accounting server to index keywords to the user identity, searching a context database for the local content using the global search key and the user identity, the context database comprising local content, search keys mapped to the local content, and context information comprising personal preferences of the user, processing the search results according to a set of rules to determine the local content to return to the HTTP proxy for display at the mobile device based on the search results and one or more rules used to determine the local content to display at the mobile device, and transmitting the local content to the mobile device via the HTTP proxy for display on the mobile device along with the global content received from the global network at the HTTP proxy in response to the global search initiated at the mobile device;
wherein the local content is based at least in part on the personal preferences of the user and the mobile device is associated with a wireless network of an enterprise and the local content is associated with the enterprise.

11. The apparatus of claim 10 further comprising memory for storing the local content.

12. The apparatus of claim 10 wherein the local content comprises a message indexed to the search key.

13. The apparatus of claim 10 wherein the processor is further operable to transmit the local content to a device associated with enterprise personnel and receive a custom response to the user by the enterprise personnel.

14. The apparatus of claim 10 further comprising a rules engine configurable to identify a set of content to display.

15. Logic encoded on one or more non-transitory computer readable media for execution and when executed operable to:
process at a network device, a global search key from an HTTP (hypertext transfer protocol) proxy interposed between a mobile device and the network device and operable to retrieve the global search key from a data packet transmitted from the mobile device to a global network for a global Internet search, the global search key based on a global search input at the mobile device and identified at the HTTP proxy by a sniffing function performed on the data packet, wherein the HTTP proxy transmits the global search key to the network device to obtain local content and to the global network to obtain the global content;
request from an authentication, authorization, and accounting server, an identity of a user initiating the global search at the mobile device;

perform analytics at the network device using information received from the authentication, authorization, and accounting server to index keywords to the user identity;

search in a context database for the local content using the global search key and the user identity, the context database comprising local content, search keys mapped to the local content, and context information comprising personal preferences of the user;

process search results by a rules engine to determine the local content to return to the HTTP proxy for display at the mobile device based on the search results and one or more rules used to determine the local content to display at the mobile device; and transmit the local content to the mobile device via the HTTP proxy for display on the mobile device along with the global content received from the global network at the HTTP proxy in response to the global search initiated at the mobile device;

wherein the local content is based at least in part on personal preferences of the user.

16. The logic of claim 15 wherein the HTTP proxy comprises the HTTP proxy located at an access point in a data path between the mobile device and the network device.

17. The logic of claim 15 wherein the local content comprises a message indexed to the search key.

18. The logic of claim 15 wherein the local content is displayed along with results from the global search.

* * * * *